United States Patent
Paulzagade et al.

(10) Patent No.: US 10,587,527 B1
(45) Date of Patent: Mar. 10, 2020

(54) SYSTEMS AND METHODS FOR APPORTIONING BANDWIDTH IN STORAGE SYSTEMS

(71) Applicant: Veritas Technologies LLC, Mountain View, CA (US)

(72) Inventors: Sudhakar Paulzagade, Pune (IN); Shreenivas Baitule, Pune (IN)

(73) Assignee: Veritas Technologies LLC, Santa Clara, CA (US)

(*) Notice: Subject to any disclaimer, the term of this patent is extended or adjusted under 35 U.S.C. 154(b) by 181 days.

(21) Appl. No.: 15/783,222

(22) Filed: Oct. 13, 2017

(51) Int. Cl.
| | |
|---|---|
| *G06F 15/173* | (2006.01) |
| *H04L 12/873* | (2013.01) |
| *H04L 29/08* | (2006.01) |
| *H04L 12/911* | (2013.01) |
| *G06F 3/06* | (2006.01) |

(52) U.S. Cl.
CPC ............ *H04L 47/527* (2013.01); *G06F 3/061* (2013.01); *H04L 47/781* (2013.01); *H04L 67/325* (2013.01); *H04L 67/1097* (2013.01)

(58) Field of Classification Search
CPC ..... H04L 47/70; H04L 47/781; H04L 47/782; H04L 47/822
See application file for complete search history.

(56) References Cited

U.S. PATENT DOCUMENTS

| | | | |
|---|---|---|---|
| 6,947,445 B1 * | 9/2005 | Barnhart | H04B 7/18584 370/232 |
| 2017/0060753 A1 * | 3/2017 | Denz | G06F 12/0871 |

OTHER PUBLICATIONS

Ketan Mahajan, et al.; Systems and Methods for Distributing Cache Space; U.S. Appl. No. 15/784,679, filed Oct. 16, 2017.

* cited by examiner

*Primary Examiner* — Yves Dalencourt
(74) *Attorney, Agent, or Firm* — FisherBroyles, LLP

(57) ABSTRACT

The computer-implemented method for apportioning bandwidth in storage systems may include (i) identifying a plurality of storage media and at least one workload that is assigned a quantity of credits at the beginning of a predetermined time period that regulate a volume of bandwidth for input/output requests from the workload, (ii) detecting an input/output request from the workload, (iii) deducting, before fulfilling the input/output request, a number of credits from a current number of credits available to the workload based on an estimated quantity of bandwidth consumed by the input/output request, (iv) measuring an actual quantity of bandwidth consumed by the input/output request, and (v) adjusting the current number of credits available to the workload for the predetermined time period based on a difference between the estimated quantity of bandwidth and the actual quantity of bandwidth.

20 Claims, 5 Drawing Sheets

SYSTEMS AND METHODS FOR APPORTIONING BANDWIDTH IN STORAGE SYSTEMS

BACKGROUND

Large amounts of digital data are generated and stored every day. Whether in the form of images and videos uploaded to a social media website, reports produced by analysis servers, or electronic communication, digital data is typically written to and read from some form of digital storage medium. Many different types of storage media exist, all with different performance characteristics. Hard drives may return sequential reads faster than random reads, while flash storage may read quickly but write slowly, and caches may return results almost instantaneously on a hit. In some storage systems, many different workloads may vie for limited bandwidth to make read and write requests to the various storage media in the storage system.

Some traditional systems for apportioning bandwidth in storage systems may apportion bandwidth by representing the available bandwidth for the system as credits, assigning each workload a set number of credits, and deducting credits for each read or write request. Unfortunately, such systems may not take into account the different characteristics of different storage media or request types, instead deducting credits based on the average latency of any request of any type made to the system. As a result, these systems may become overwhelmed if too many high-latency requests are received simultaneously and/or may operate well below their maximum capacity when receiving many low-latency requests. Accordingly, the instant disclosure describes improved systems and methods for apportioning bandwidth in storage systems.

SUMMARY

As will be described in greater detail below, the instant disclosure describes various systems and methods for apportioning bandwidth in storage systems by assigning credits to workloads that represent the volume of bandwidth that the workload may consume during a given time period and adjusting the number of credits deducted from the workload for each input/output (I/O) request based on the actual bandwidth consumed by the I/O request rather than calculating credit deductions based on an estimated bandwidth consumed by the request.

In one example, a computer-implemented method for apportioning bandwidth in storage systems may include (i) identifying a group of storage media and at least one workload that sends I/O requests to the storage media and that is assigned a quantity of credits at the beginning of a predetermined time period that regulate a volume of bandwidth for I/O requests from the workload that will be accepted by the storage media during the predetermined time period, (ii) detecting an I/O request from the workload directed to a storage medium within the storage media during the predetermined time period, (iii) deducting, before fulfilling the I/O request, a number of credits from a current number of credits available to the workload based on an estimated quantity of bandwidth consumed by the I/O request, (iv) measuring, while fulfilling the I/O request, an actual quantity of bandwidth consumed by the I/O request, and (v) adjusting the current number of credits available to the workload for the predetermined time period based on a difference between the estimated quantity of bandwidth consumed by the I/O request and the actual quantity of bandwidth consumed by the I/O request.

In some examples, adjusting the current number of credits available to the workload for the predetermined time period may include increasing the current number of credits available to the workload in response to determining that the actual quantity of bandwidth consumed by the I/O request is less than the estimated quantity of bandwidth consumed by the I/O request. In other examples, adjusting the current number of credits available to the workload for the predetermined time period may include decreasing the current number of credits available to the workload in response to determining that the actual quantity of bandwidth consumed by the I/O request is more than the estimated quantity of bandwidth consumed by the I/O request.

In one embodiment, the estimated quantity of bandwidth consumed by the I/O request may be calculated based at least in part on an average quantity of bandwidth consumed by each I/O request fulfilled by the storage media during a previous predetermined time period. In some embodiments, the computer-implemented method may further include calculating, at the end of the predetermined time period, an average quantity of bandwidth consumed by each I/O request fulfilled by the storage media during the predetermined time period and calculating a new estimated quantity of bandwidth consumed by each I/O request to the storage media based on the average quantity of bandwidth consumed by each I/O request fulfilled by the storage media during the predetermined time period. In one embodiment, the computer-implemented method may further include, at the beginning of a new predetermined time period that begins after the end of the predetermined time period, discarding the current number of credits available to the workload for the predetermined time period and assigning a new quantity of credits to the workload for the new predetermined time period.

In some examples, the storage media may include a set of storage media types, where each storage media type has a different expected latency for fulfilling I/O requests than at least one other storage media type within the storage media types. Additionally or alternatively, the storage media may include at least two of: (i) a storage medium configured to perform a deduplication operation on incoming data, (ii) a storage medium configured to perform a compression operation on incoming data, and/or (iii) a storage medium configured to store incoming data without performing a deduplication operation or a compression operation on the incoming data. In some examples, the storage media may include at least one storage medium with a different expected latency for fulfilling write requests than for fulfilling read requests.

In one embodiment, a system for implementing the above-described method may include (i) an identification module, stored in memory, that identifies a group of storage media and at least one workload that sends I/O requests to the storage media and that is assigned a quantity of credits at the beginning of a predetermined time period that regulate a volume of bandwidth for I/O requests from the workload that will be accepted by the storage media during the predetermined time period, (ii) a detection module, stored in memory, that detects an I/O request from the workload directed to a storage medium within the storage media during the predetermined time period, (iii) a deduction module, stored in memory, that deducts, before fulfilling the I/O request, a number of credits from a current number of credits available to the workload based on an estimated quantity of bandwidth consumed by the I/O request, (iv) a measurement module, stored in memory, that measures, while fulfilling the I/O request, an actual quantity of bandwidth consumed by the I/O request, (v) an adjustment module, stored in memory, that adjusts the current number of credits available to the workload for the predetermined time period based on a difference between the estimated quantity of bandwidth consumed by the I/O request and the actual quantity of bandwidth consumed by the I/O request, and (vi) at least one physical processor configured to execute the identification module, the detection module, the deduction module, the measurement module, and the adjustment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of storage media and at least one workload that sends I/O requests to the storage media and that is assigned a quantity of credits at the beginning of a predetermined time period that regulate a volume of bandwidth for I/O requests from the workload that will be accepted by the storage media during the predetermined time period, (ii) detect an I/O request from the workload directed to a storage medium within the storage media during the predetermined time period, (iii) deduct, before fulfilling the I/O request, a number of credits from a current number of credits available to the workload based on an estimated quantity of bandwidth consumed by the I/O request, (iv) measure, while fulfilling the I/O request, an actual quantity of bandwidth consumed by the I/O request, and (v) adjust the current number of credits available to the workload for the predetermined time period based on a difference between the estimated quantity of bandwidth consumed by the I/O request and the actual quantity of bandwidth consumed by the I/O request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
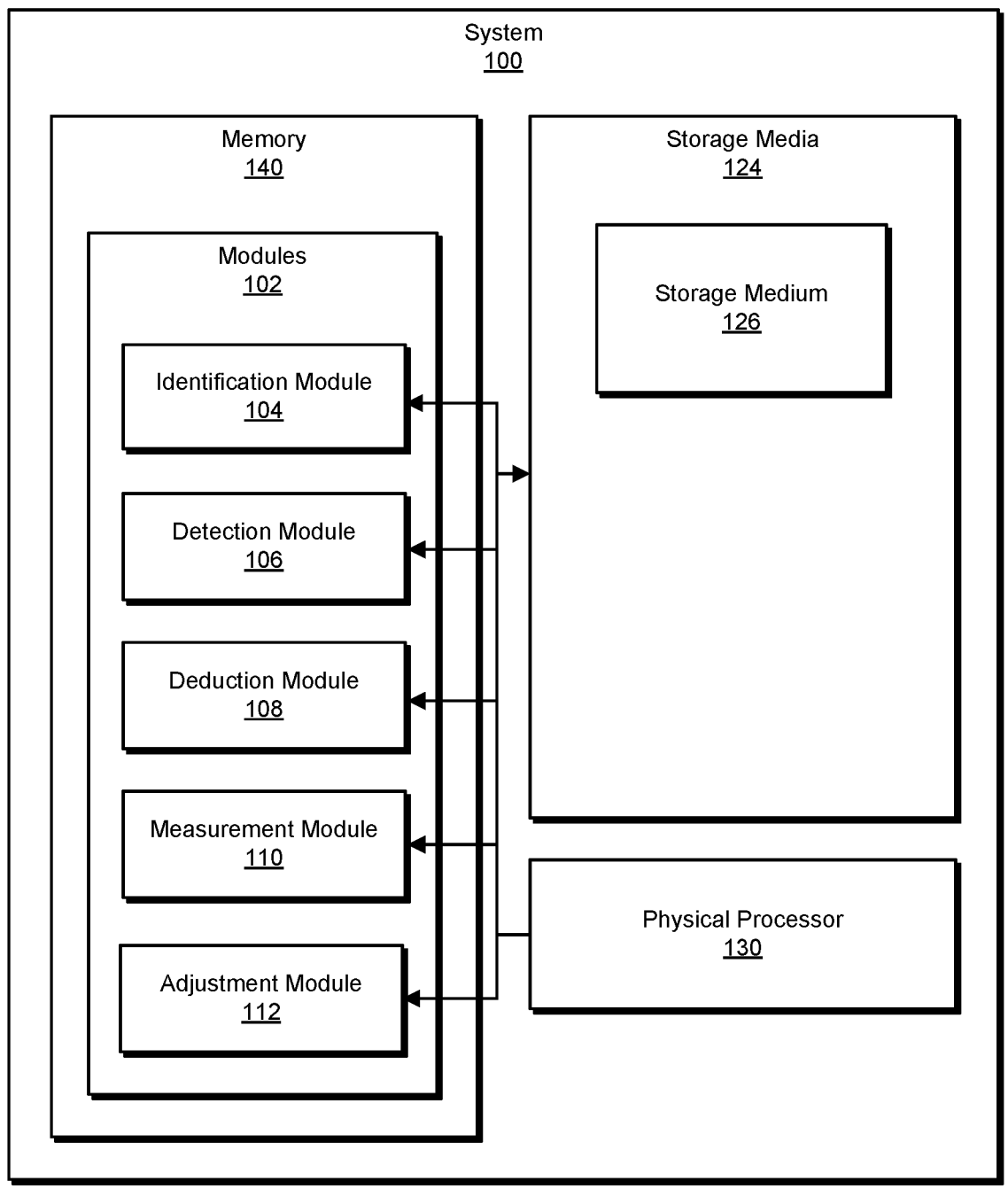
FIG. 1 is a block diagram of an example system for apportioning bandwidth in storage systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for apportioning bandwidth in storage systems. As will be explained in greater detail below, by adjusting the credits deducted from workloads based on the actual bandwidth consumed by I/O requests, the various systems and methods described herein may be able to more efficiently allocate bandwidth for storage systems. By using actual measurements rather than estimates for bandwidth consumption, the various systems and methods described herein may potentially reduce system congestion caused by large numbers of high-latency requests and/or improve system utilization during periods with large numbers of low-latency requests. Additionally or alternatively, these systems and methods may improve the field of data storage by allowing data to be written to and/or retrieved from storage systems more efficiently.

Figure 2:
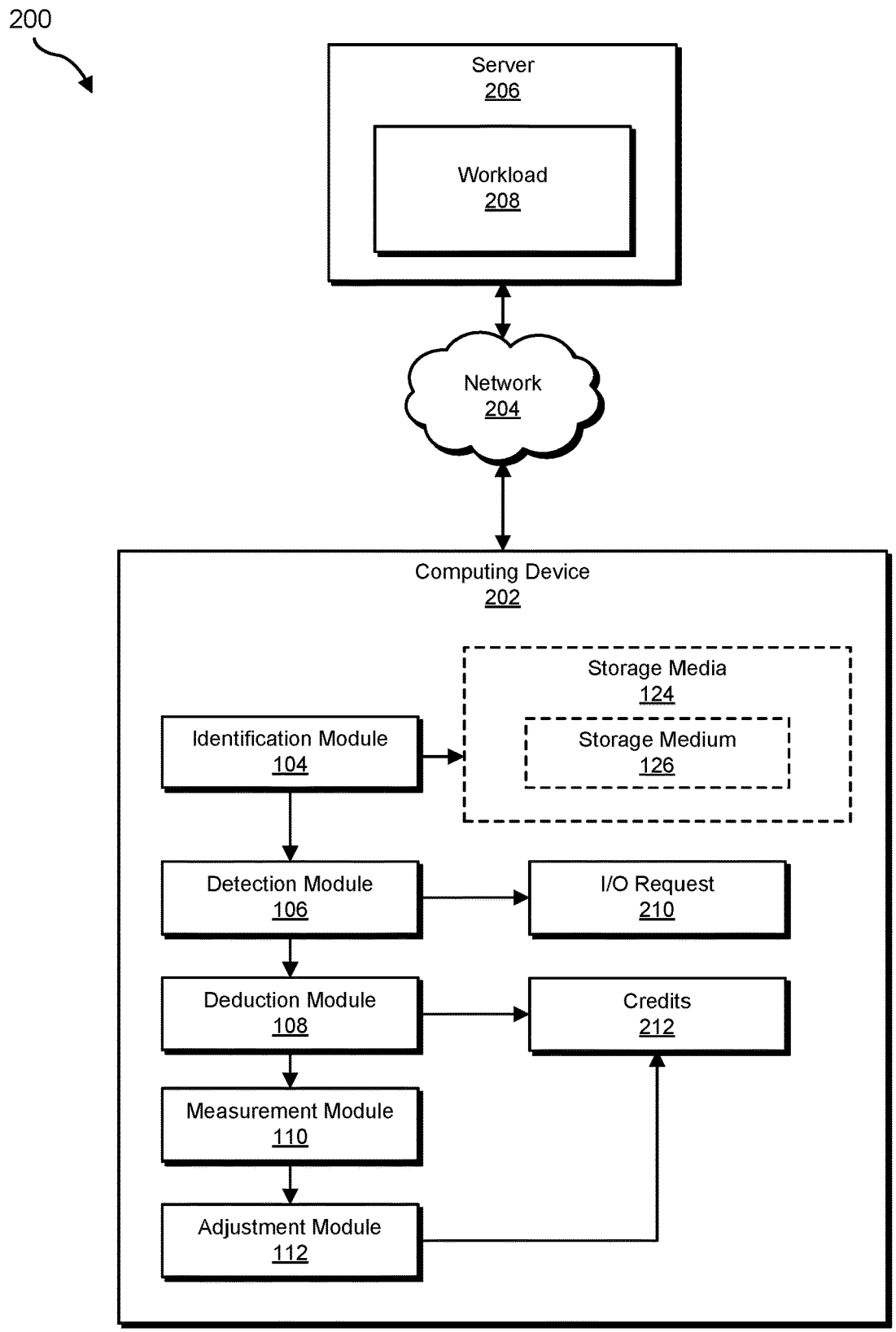
FIG. 2 is a block diagram of an additional example system for apportioning bandwidth in storage systems.
Figure 3:
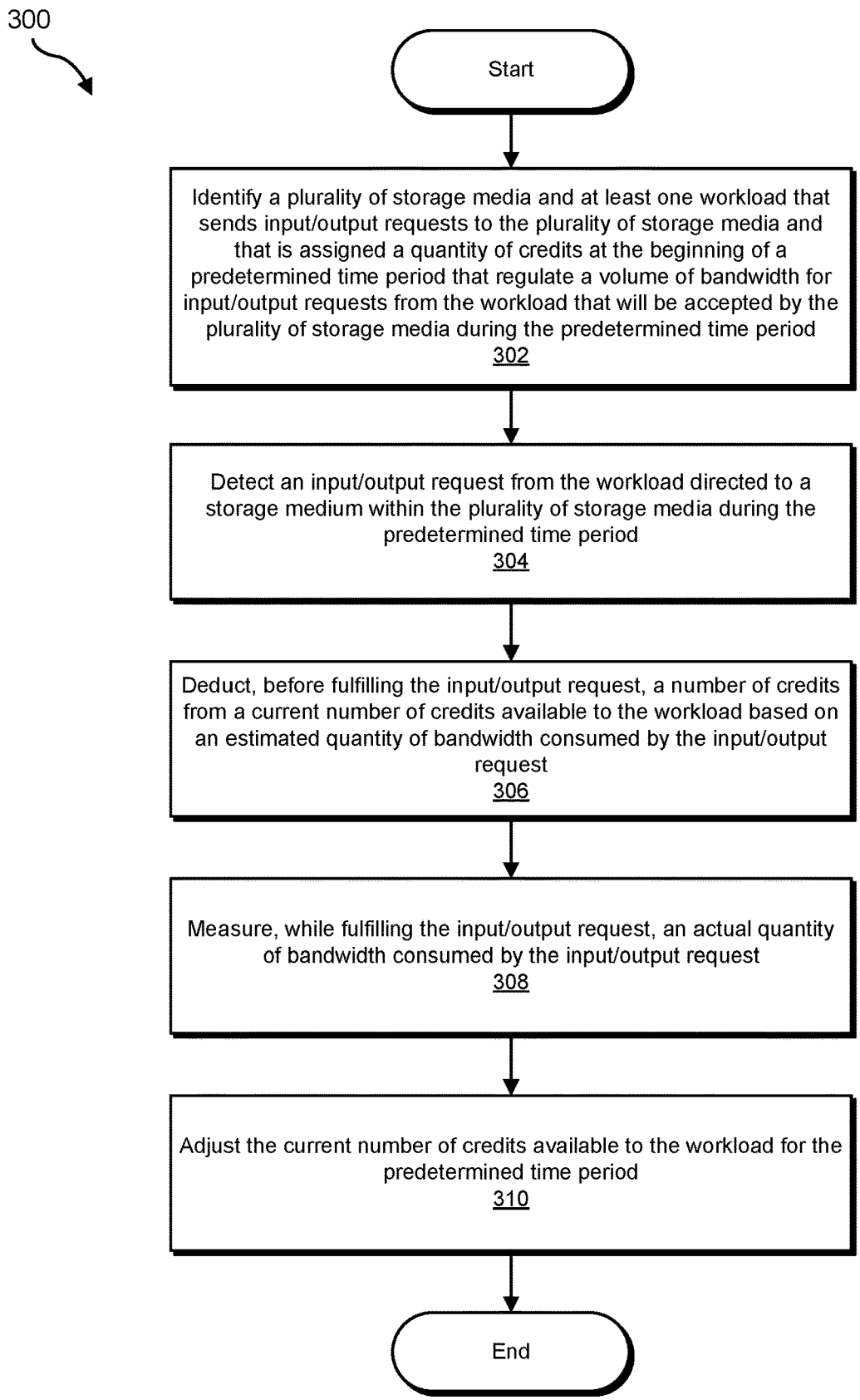
FIG. 3 is a flow diagram of an example method for apportioning bandwidth in storage systems.
Figure 4:
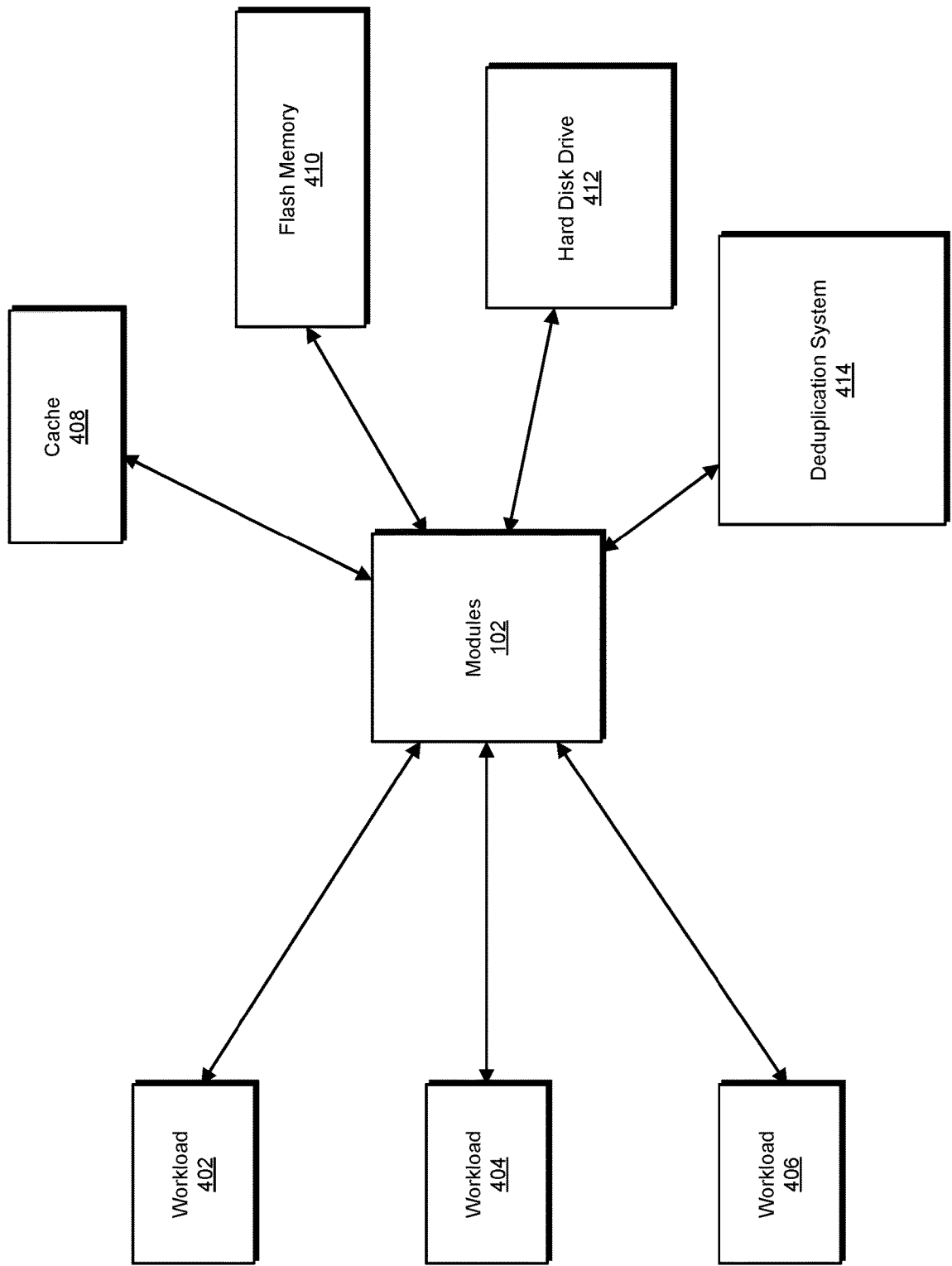
FIG. 4 is a block diagram of an example computing system for apportioning bandwidth in storage systems.

The following will provide, with reference to FIGS. 1, 2, and 4, detailed descriptions of example systems for apportioning bandwidth in storage systems. Detailed descriptions of corresponding computer-implemented methods will also be provided in connection with FIGS. 3 and 5.

FIG. 1 is a block diagram of example system 100 for apportioning bandwidth in storage systems. As illustrated in this figure, example system 100 may include one or more modules 102 for performing one or more tasks. For example, and as will be explained in greater detail below, example system 100 may include an identification module 104 that identifies a group of storage media and at least one workload that sends I/O requests to the storage media and that is assigned a quantity of credits at the beginning of a predetermined time period that regulate a volume of bandwidth for I/O requests from the workload that will be accepted by the storage media during the predetermined time period. Example system 100 may additionally include a detection module 106 that detects an I/O request from the workload directed to a storage medium within the plurality of storage media during the predetermined time period. Example system 100 may also include a deduction module 108 that deducts, before fulfilling the I/O request, a number of credits from a current number of credits available to the workload based on an estimated quantity of bandwidth consumed by the I/O request. Example system 100 may additionally include a measurement module 110 that measures, while fulfilling the I/O request, an actual quantity of bandwidth consumed by the I/O request. Example system 100 may also include an adjustment module 112 that adjusts the current number of credits available to the workload for the predetermined time period based on a difference between the estimated quantity of bandwidth consumed by the I/O request and the actual quantity of bandwidth consumed by the I/O request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate apportioning bandwidth in storage systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more storage media 124, such as storage medium 126. Storage medium 126 generally represents any type or form of physical and/or virtual device capable of storing electronic data.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to apportion bandwidth in storage systems.

Computing device 202 generally represents any type or form of computing device capable of reading computer-executable instructions. In one embodiment, computing device 202 may represent one or more servers in a physical or virtual data center. Additional examples of computing device 202 include, without limitation, laptops, tablets, desktops, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of hosting one or more workloads. In one embodiment, server 206 may be a remote (i.e., cloud) server. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Workload 208 generally represents any type of application, script, program, software, and/or virtual machine configured to perform one or more computing tasks. I/O request 210 generally represents any form of electronic message that contains data to be written to a storage medium and/or a request to read data from a storage medium. Credits 212 generally represents any object, variable, and/or other data used to track a measurement of bandwidth allocated for usage by a workload during a specified time period.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for apportioning bandwidth in storage systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a group of storage media and at least one workload that sends I/O requests to the storage media and that is assigned a quantity of credits at the beginning of a predetermined time period that regulate a volume of bandwidth for I/O requests from the workload that will be accepted by the storage media during the predetermined time period. For example, identification module 104 may, as part of computing device 202 in FIG. 2, identify storage media 124 and at least one workload 208 that sends I/O requests to storage media 124 and that is assigned a quantity of credits 212 at the beginning of a predetermined time period that regulate a volume of bandwidth for I/O requests from workload 208 that will be accepted by storage media 124 during the predetermined time period.

The term "storage medium," as used herein, generally refers to any device and/or component of a device configured to store electronic data in physical and/or virtual memory. In some examples, a storage medium may be designed to store large amounts of data, write data efficiently to memory, and/or retrieve data efficiently from memory. Examples of storage media may include, without limitation, flash drives, solid state drives, hard disk drives, random access memory, and/or caches. In some examples, a storage medium may be configured to perform one or more operations on data before storing the data. For example, a storage medium may be configured to perform a deduplication operation (i.e., only store data that is not already stored) a compression operation, and/or an encryption operation.

The term "storage system," as used herein, generally refers to any group of storage media that share a limited amount of bandwidth to fulfill I/O requests. In some embodiments, a storage system may also include one or more modules that manage the storage media within the storage system, such as modules that distributes, check, and/or adjust credits assigned to workloads that make I/O requests to storage media within the storage system.

The term "workload," as used herein, generally refers to any script, process, application, code, and/or software configured to perform at least one computing task. In some embodiments, a workload may include a virtual machine and/or be hosted within a virtual machine and/or container. In some examples, a workload may be hosted on a remote server. In one example, multiple workloads that access the same storage system may be hosted on the same server. In other examples, multiple workloads that access the same storage system may be hosted on different servers. In some examples, the term "workload" may refer to a job, task, and/or application hosted by and/or executed within a virtual data center. For example, a virtual data center may provision a workload with one or more virtualized resources (including, e.g., storage bandwidth).

The term "I/O request," or "request," as used herein, generally refers to any electronic message that contains data to be written and/or a request for data to be read. In some examples, an I/O request may be a read request. In other examples, an I/O request may be a write request. In some examples, an I/O request may be directed at a specific storage medium within a group of storage media. For example, an I/O request may be directed at a cache.

The term "credit," as used herein, generally refers to any variable, object, file, and/or other method for tracking the amount of bandwidth apportioned to a workload during a predetermined time period. In some embodiments, the systems described herein may calculate the total number of credits available to all workloads that make requests of a storage system during a time period by dividing the total bandwidth available by the average bandwidth consumed by I/O requests to the storage system during a previous predetermined time period. In some examples, all workloads that make requests of a storage system may receive equal portions of the total number of credits available. In other examples, workloads may receive different numbers of credits based on the size of the workloads, the priority assigned to each workload by an administrator, and/or other factors. In some embodiments, credits may be limited to integer values. In other embodiments, the systems described herein may assign and/or deduct portions of credits.

The term "bandwidth," as used herein, generally refers to the resources available for and/or consumed by an I/O request. In one embodiment, bandwidth may include network bandwidth across one or more networks. In some embodiments, a storage system may have a predictable, limited amount of bandwidth for fulfilling I/O requests within any given time period. In some examples, the bandwidth consumed by a request may be measured in terms of latency (i.e., the time it takes to fulfill the request).

The term "predefined time period," as used herein, generally refers to any set length of time with a defined beginning and ending. In some embodiments, a predefined time period may be an epoch (i.e., one second). In some embodiments, a set of predefined time periods may be continuous and may not overlap, such that the next predefined time period starts when the current predefined time period ends.

Identification module 104 may identify the storage media and/or workload in any of a variety of ways and in any of a variety of contexts. For example, identification module 104 may identify a storage system that includes various different storage media and/or workloads. In one embodiment, as illustrated in FIG. 4, modules 102 may handle I/O requests from a workload 402, a workload 404, and/or a workload 406 directed at a cache 408, flash memory 410, a hard disk drive 412, and/or a deduplication system 414. In some embodiments, modules 102, workloads 402, 404, and/or 406, cache 408, flash memory 410, hard disk drive 412, and/or deduplication system 414 may all be hosted on a local network. In other embodiments, modules 102, workloads 402, 404, and/or 406, cache 408, flash memory 410, hard disk drive 412, and/or deduplication system 414 may be hosted remotely (i.e., in the cloud).

In some embodiments, the storage media may include different storage media types, where each storage media type has a different expected latency for fulfilling I/O requests than at least one other storage media type. For example, a cache may have a different expected latency for fulfilling I/O requests than a hard disk drive. In another example, a newer flash drive may have better performance characteristics and thus reduced latency compared to an older flash drive. In some examples, a flash drive may have a lower expected latency than a hard disk drive. In some embodiments, different types of storage media may have different expected latencies when fulfilling different types of requests. For example, a hard disk drive may fulfill sequential read and/or write operations more quickly than random read and/or write operations. In one example, the storage media may include at least one storage medium with a different expected latency for fulfilling write requests than for fulfilling read requests, such as flash memory.

Additionally or alternatively, the storage media may include at least two of a storage medium configured to perform a deduplication operation on incoming data, a storage medium configured to perform a compression operation incoming data, and a storage medium configured to store incoming data without performing a deduplication operation or a compression operation on the incoming data. In some embodiments, storage media that perform operations on data may have different expected latencies than storage media that do not. For example, a flash drive that compresses all data stored to the drive may have a longer latency for write requests than a similar flash drive that does not compress data stored to the drive. In another example, a drive that performs a deduplication operation on data may have very little latency when an I/O request contains data that is already stored in the drive (because the drive will not write the data in that case) but may have longer latency than similar drives when an I/O request contains data that is not already stored in the drive, because the drive must not only store the data but must first check to determine whether the data is already stored.

Because of the different performance characteristics of different types of storage media and storage media that performs different tasks, the average latency for an entire storage system may not accurately reflect the actual latency of any individual request within the storage system. For example, in a storage system that includes a very low-latency flash drive and a very high-latency hard disk drive, the average latency for an I/O request may be longer than the latency of any request to the flash drive and shorter than any request to the hard disk drive. In this example, a system that allows the same number of requests to be made simultaneously no matter the type of request may experience congestion when most requests are directed at the hard disk drive and/or may not utilize all available bandwidth when most requests are directed at the flash drive.

In some embodiments, identification module 104 may identify the workloads and/or storage media in the context of performing quality of service operations on the storage system. In one embodiment, the systems described herein may be configured to improve the efficiency of a storage system in order to ensure high quality of service for all workloads that send requests to the storage system. In some examples, the systems described herein may ensure that service level agreements for one or more workloads are honored by preventing the storage system from experiencing congestion and/or inefficiency that reduces the ability of the storage system to fulfill requests from workloads in accordance with the service level agreements.

Returning to FIG. 3, at step 304, one or more of the systems described herein may detect an I/O request from the workload directed to a storage medium within the plurality of storage media during the predetermined time period. For example, detection module 106 may, as part of computing device 202 in FIG. 2, detect I/O request 210 from workload 208 directed to storage medium 126 within storage media 124 during the predetermined time period.

Detection module 106 may detect the I/O request in a variety of ways and/or contexts. For example, detection module 106 may intercept the I/O request. In another embodiment, the storage system may be configured such that all I/O requests directed at the storage media are routed through detection module 106.

At step 306, one or more of the systems described herein may deduct, before fulfilling the I/O request, a number of credits from a current number of credits available to the workload based on an estimated quantity of bandwidth consumed by the I/O request. For example, deduction module 108 may, as part of computing device 202 in FIG. 2, deduct, before fulfilling the I/O request, a number of credits from credits 212 available to workload 208 based on an estimated quantity of bandwidth consumed by I/O request 210.

Deduction module 108 may deduct the credits in a variety of contexts. For example, before accepting the request, deduction module 108 may first check that the current number of credits available to the workload is higher than the number of credits that will be deducted to fulfill the request.

Deduction module 108 may calculate the quantity of credits to deduct in a variety of ways. In one embodiment, the estimated quantity of bandwidth consumed by the I/O request may be calculated based at least in part on an average quantity of bandwidth consumed by each I/O request fulfilled by the storage media during a previous predetermined time period. For example, if the predetermined time period is one second, deduction module 108 may calculate the average quantity of bandwidth consumed by each request during the previous second. In some embodiments, deduction module 108 may then divide the total available bandwidth for the storage system by the average quantity of bandwidth consumed by each request to arrive at the quantity of credits to deduct for each request.

In one embodiment, the systems described herein may calculate, at the end of the predetermined time period, an average quantity of bandwidth consumed by each I/O request fulfilled by the storage media during the predetermined time period and may then calculate a new estimated quantity of bandwidth consumed by each I/O request to the storage media based on the average quantity of bandwidth consumed by each I/O request fulfilled by the storage media during the predetermined time period. In some embodiments, the systems described herein may calculate a new average at the end of each time period. In other embodiments, the systems described herein may calculate a new average at the end of some time periods but not others. For example, the systems described herein may calculate a new average every five, ten, or sixty time periods.

At step 308, one or more of the systems described herein may measure, while fulfilling the I/O request, an actual quantity of bandwidth consumed by the I/O request. For example, measurement module 110 may, as part of computing device 202 in FIG. 2, measure, while fulfilling the I/O request, an actual quantity of bandwidth consumed by the I/O request.

Measurement module 110 may measure the bandwidth consumed by the I/O request in a variety of ways. For example, measurement module 110 may measure the time between when the I/O request was initiated and when the I/O request was completed. In some embodiments, measurement module 110 may measure the bandwidth consumed by each I/O request made to the storage media. In one embodiment, measurement module 110 may store the measurements of the bandwidth consumed by each I/O request. For example, measurement module 110 may store the measurements of the bandwidth consumed by each I/O request so that the measurements can later be averaged to calculate an average latency for I/O requests.

At step 310, one or more of the systems described herein may adjust the current number of credits available to the workload for the predetermined time period based on a difference between the estimated quantity of bandwidth consumed by the I/O request and the actual quantity of bandwidth consumed by the I/O request. For example, adjustment module 112 may, as part of computing device 202 in FIG. 2, adjust credits 212 available to workload 208 for the predetermined time period based on a difference between the estimated quantity of bandwidth consumed by I/O request 210 and the actual quantity of bandwidth consumed by I/O request 210.

Adjustment module 112 may adjust the credits available to the workload for the predetermined time period in a variety of ways. In some examples, adjustment module 112 may adjust the current number of credits available to the workload for the predetermined time period by increasing the current number of credits available to the workload in response to determining that the actual quantity of bandwidth consumed by the I/O request is less than the estimated quantity of bandwidth consumed by the I/O request. For example, if the I/O request was a read request to the cache that was a cache hit, the I/O request may have consumed a negligible amount of bandwidth and adjustment module 112 may refund all of the credits deducted from the workload in connection with the I/O request. In another example, if the I/O request was a read request to flash memory, the I/O request may have consumed less bandwidth than the average request fulfilled by the storage system and adjustment module 112 may refund a portion of the credits deducted from the workload in connection with the I/O request.

Additionally or alternatively, adjustment module 112 may adjust the current number of credits available to the workload for the predetermined time period by decreasing the current number of credits available to the workload in response to determining that the actual quantity of bandwidth consumed by the I/O request is more than the estimated quantity of bandwidth consumed by the I/O request. For example, if the I/O request was a random read request to a hard disk drive, the I/O request may have consumed more bandwidth than the average I/O request fulfilled by the storage system and adjustment module 112 may deduct an additional amount of credits from the workload above the amount of credits already deducted from the workload before fulfilling the I/O request.

In one embodiment, systems described herein may, at the beginning of a new predetermined time period that begins after the end of the predetermined time period, discard the current number of credits available to the workload for the predetermined time period and assign a new quantity of credits to the workload for the new predetermined time period. In some embodiments, workloads may have a set amount of credits for each time period that refresh at the beginning of the next time period whether or not the workload consumed all of the available credits for the previous time period.

Figure 5:
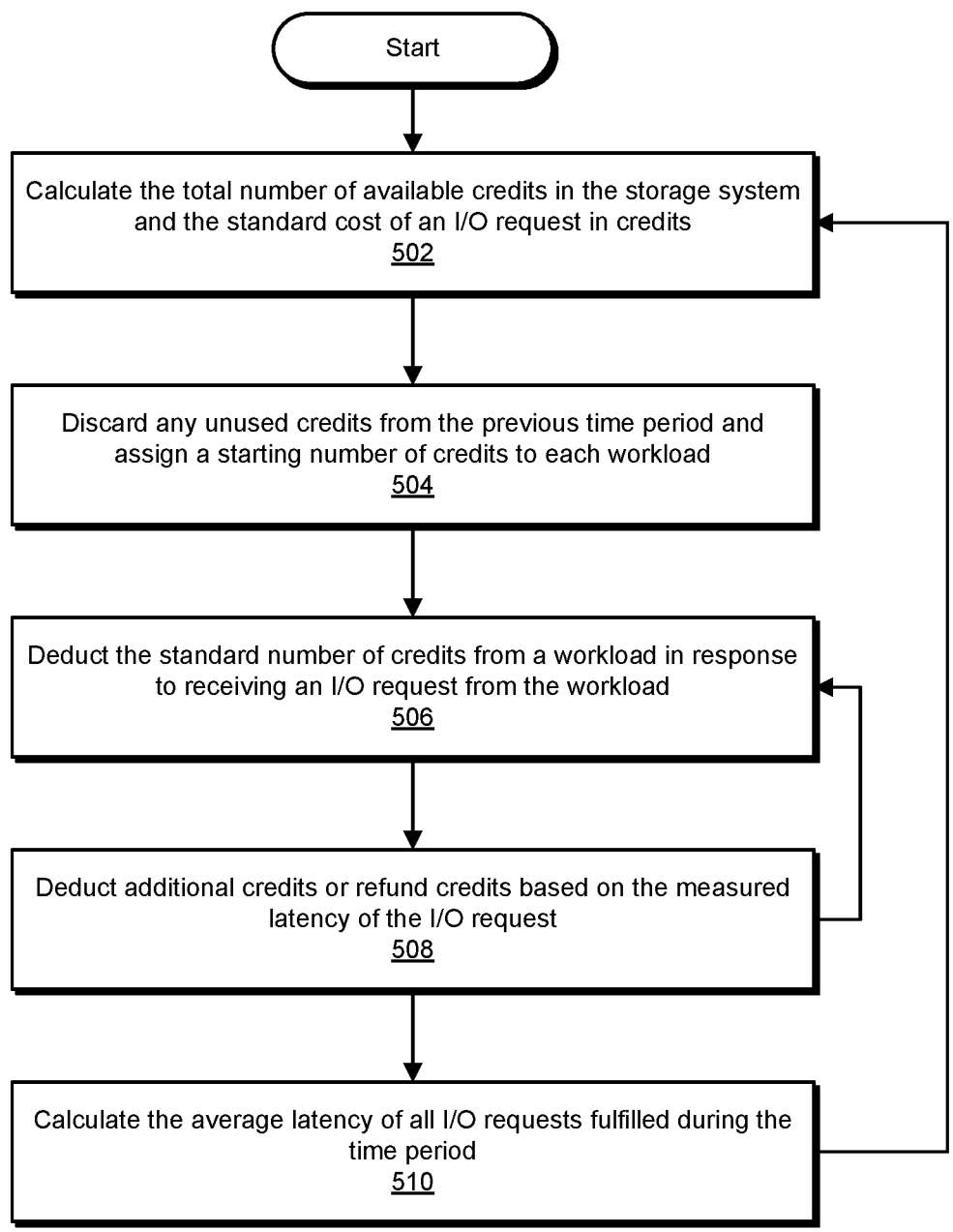
FIG. 5 is a flow diagram of an example computing method for apportioning bandwidth in storage systems.

In some embodiments, the systems described herein may calculate, assign, deduct, adjust, and/or refresh credits in a cycle that repeats each time period. For example, as illustrated in FIG. 5, at step 502, the systems described herein may calculate the total number of available credits in the storage system and/or the standard cost of a request in credits. For example, the systems described herein may calculate a capacity for the system in I/O operations per second by dividing the number of I/O requests the system can queue at once by the average latency of requests during the previous time period.

At step 504, the systems described herein may discard any unused credits from the previous time period and may assign a starting number of credits for the time period to each workload. In some examples, the systems described herein may distribute a number of credits equal to the capacity of the storage system among all of the workloads that make I/O requests of the storage system. In some embodiments, all workloads may receive an equal portion of credits. In other embodiments, workloads may receive varying amounts of credits based on size, service level agreements, and/or other factors.

At step 506, the systems described herein may deduct the standard number of credits associated with the average latency of requests during the previous time period from a workload in response to receiving an I/O request from the workload. In some embodiments, the systems described herein may first check to determine whether the workload possesses the correct number of credits before accepting the request. In some embodiments, the systems described herein may deduct credits before accepting requests in order to prevent the storage system from becoming overwhelmed by too large a volume of simultaneous requests.

At step 508, the systems described herein may deduct additional credits from the workload or refund credits to the workload based on the measured latency of the I/O request from the workload. In some examples, if the measured latency of the I/O request is lower than the estimated latency based on the average latency of requests in the previous time period, the systems described herein may refund credits to the workload. In other examples, if the measured latency is higher than the estimated latency, the systems described herein may deduct additional credits from the workload. If the workload makes additional I/O requests during the predetermined time period, the systems described herein may return to step 506. In some embodiments, steps 506 and/or 508 may repeat until the workload no longer has sufficient credits to make further requests or until the time period comes to an end, whichever happens first.

At step 510, at the end of the time period, the systems described herein may calculate the average latency for all I/O requests fulfilled during the time period. The systems described herein may then return to step 502 and restart the process of calculating and assigning credits based on the latency data collected during the time period that just ended.

As explained in connection with method 300 above, the systems and methods described herein may efficiently apportion bandwidth in a storage system by adjusting the credits deducted from workloads for I/O requests based on the actual latency of the requests rather than an average and/or estimated latency. By using the actual latency, the systems described herein may prevent overutilization of storage systems in situations with many high-latency requests and/or may prevent underutilization of storage systems in situations with many low-latency requests. In some examples, the systems described herein may utilize the maximum capacity of a storage system and/or storage media within the storage system. In addition, because the systems described herein measure the latency of individual requests rather than generalizing over a category of similar requests, the systems described herein may be storage-media-agnostic and may improve the efficiency of storage systems that contain many different types and/or configurations of storage media without requiring administrator intervention to specify expected latencies of different request types for different media types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for apportioning bandwidth in storage systems, at least a portion of the method being performed by a computing device comprising at least one processor, the method comprising:
   identifying:
      a plurality of storage media; and
      at least one workload that sends input/output requests to the plurality of storage media and that is assigned a quantity of credits at the beginning of a predetermined time period that regulate a volume of bandwidth for input/output requests from the workload that will be accepted by the plurality of storage media during the predetermined time period;
   detecting an input/output request from the workload directed to a storage medium within the plurality of storage media during the predetermined time period;
   deducting, before fulfilling the input/output request, a number of credits from a current number of credits available to the workload based on an estimated quantity of bandwidth consumed by the input/output request;
   measuring, while fulfilling the input/output request, an actual quantity of bandwidth consumed by the input/output request; and
   adjusting the current number of credits available to the workload for the predetermined time period based on a difference between the estimated quantity of bandwidth consumed by the input/output request and the actual quantity of bandwidth consumed by the input/output request.

2. The computer-implemented method of claim 1, wherein adjusting the current number of credits available to the workload for the predetermined time period comprises increasing the current number of credits available to the workload in response to determining that the actual quantity of bandwidth consumed by the input/output request is less than the estimated quantity of bandwidth consumed by the input/output request.

3. The computer-implemented method of claim 1, wherein adjusting the current number of credits available to the workload for the predetermined time period comprises decreasing the current number of credits available to the workload in response to determining that the actual quantity of bandwidth consumed by the input/output request is more than the estimated quantity of bandwidth consumed by the input/output request.

4. The computer-implemented method of claim 1, wherein the estimated quantity of bandwidth consumed by the input/output request is calculated based at least in part on an average quantity of bandwidth consumed by each input/output request fulfilled by the plurality of storage media during a previous predetermined time period.

5. The computer-implemented method of claim 4, further comprising:
calculating, at the end of the predetermined time period, an average quantity of bandwidth consumed by each input/output request fulfilled by the plurality of storage media during the predetermined time period; and
calculating a new estimated quantity of bandwidth consumed by each input/output request to the plurality of storage media based on the average quantity of bandwidth consumed by each input/output request fulfilled by the plurality of storage media during the predetermined time period.

6. The computer-implemented method of claim 1, further comprising, at the beginning of a new predetermined time period that begins after the end of the predetermined time period, discarding the current number of credits available to the workload for the predetermined time period and assigning a new quantity of credits to the workload for the new predetermined time period.

7. The computer-implemented method of claim 1, wherein the plurality of storage media comprises a plurality of storage media types, wherein each storage media type has a different expected latency for fulfilling input/output requests than at least one other storage media type within the plurality of storage media types.

8. The computer-implemented method of claim 1, wherein the plurality of storage media comprises at least two of:
a storage medium configured to perform a deduplication operation on incoming data;
a storage medium configured to perform a compression operation incoming data; and
a storage medium configured to store incoming data without performing a deduplication operation or a compression operation on the incoming data.

9. The computer-implemented method of claim 1, wherein the plurality of storage media comprises at least one storage medium with a different expected latency for fulfilling write requests than for fulfilling read requests.

10. A system for apportioning bandwidth in storage systems, the system comprising:

an identification module, stored in memory, that identifies:
a plurality of storage media;
at least one workload that sends input/output requests to the plurality of storage media and that is assigned a quantity of credits at the beginning of a predetermined time period that regulate a volume of bandwidth for input/output requests from the workload that will be accepted by the plurality of storage media during the predetermined time period;
a detection module, stored in memory, that detects an input/output request from the workload directed to a storage medium within the plurality of storage media during the predetermined time period;
a deduction module, stored in memory, that deducts, before fulfilling the input/output request, a number of credits from a current number of credits available to the workload based on an estimated quantity of bandwidth consumed by the input/output request;
a measurement module, stored in memory, that measures, while fulfilling the input/output request, an actual quantity of bandwidth consumed by the input/output request;
an adjustment module, stored in memory, that adjusts the current number of credits available to the workload for the predetermined time period based on a difference between the estimated quantity of bandwidth consumed by the input/output request and the actual quantity of bandwidth consumed by the input/output request; and
at least one physical processor configured to execute the identification module, the detection module, the deduction module, the measurement module, and the adjustment module.

11. The system of claim 10, wherein the adjustment module adjusts the current number of credits available to the workload for the predetermined time period by increasing the current number of credits available to the workload in response to determining that the actual quantity of bandwidth consumed by the input/output request is less than the estimated quantity of bandwidth consumed by the input/output request.

12. The system of claim 10, wherein the adjustment module adjusts the current number of credits available to the workload for the predetermined time period by decreasing the current number of credits available to the workload in response to determining that the actual quantity of bandwidth consumed by the input/output request is more than the estimated quantity of bandwidth consumed by the input/output request.

13. The system of claim 10, wherein the estimated quantity of bandwidth consumed by the input/output request is calculated based at least in part on an average quantity of bandwidth consumed by each input/output request fulfilled by the plurality of storage media during a previous predetermined time period.

14. The system of claim 13, wherein the adjustment module:
calculates, at the end of the predetermined time period, an average quantity of bandwidth consumed by each input/output request fulfilled by the plurality of storage media during the predetermined time period; and
calculates a new estimated quantity of bandwidth consumed by each input/output request to the plurality of storage media based on the average quantity of bandwidth consumed by each input/output request fulfilled by the plurality of storage media during the predetermined time period.

15. The system of claim 10, wherein the adjustment module, at the beginning of a new predetermined time period that begins after the end of the predetermined time period, discards the current number of credits available to the workload for the predetermined time period and assigns a new quantity of credits to the workload for the new predetermined time period.

16. The system of claim 10, wherein the plurality of storage media comprises a plurality of storage media types, wherein each storage media type has a different expected latency for fulfilling input/output requests than at least one other storage media type within the plurality of storage media types.

17. The system of claim 10, wherein the plurality of storage media comprises at least two of:
 a storage medium configured to perform a deduplication operation on incoming data;
 a storage medium configured to perform a compression operation incoming data; and
 a storage medium configured to store incoming data without performing a deduplication operation or a compression operation on the incoming data.

18. The system of claim 10, wherein the plurality of storage media comprises at least one storage medium with a different expected latency for fulfilling write requests than for fulfilling read requests.

19. A non-transitory computer-readable medium comprising one or more computer-readable instructions that, when executed by at least one processor of a computing device, cause the computing device to:
 identify:
  a plurality of storage media; and
  at least one workload that sends input/output requests to the plurality of storage media and that is assigned a quantity of credits at the beginning of a predetermined time period that regulate a volume of bandwidth for input/output requests from the workload that will be accepted by the plurality of storage media during the predetermined time period;
 detect an input/output request from the workload directed to a storage medium within the plurality of storage media during the predetermined time period;
 deduct, before fulfilling the input/output request, a number of credits from a current number of credits available to the workload based on an estimated quantity of bandwidth consumed by the input/output request;
 measure, while fulfilling the input/output request, an actual quantity of bandwidth consumed by the input/output request; and
 adjust the current number of credits available to the workload for the predetermined time period based on a difference between the estimated quantity of bandwidth consumed by the input/output request and the actual quantity of bandwidth consumed by the input/output request.

20. The non-transitory computer-readable medium of claim 19, wherein the one or more computer-readable instructions cause the computing device to adjust the current number of credits available to the workload for the predetermined time period by increasing the current number of credits available to the workload in response to determining that the actual quantity of bandwidth consumed by the input/output request is less than the estimated quantity of bandwidth consumed by the input/output request.

* * * * *